US012565951B2

(12) United States Patent
    Wiegand

(10) Patent No.:   US 12,565,951 B2
(45) Date of Patent:       Mar. 3, 2026

(54) FLANGE COUPLING SYSTEM FOR CONNECTING PIPES IN AN AIRCRAFT

(71) Applicant: Airbus Operations GmbH, Hamburg (DE)

(72) Inventor: Steffen Wiegand, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/653,467

(22) Filed: May 2, 2024

(65) Prior Publication Data

US 2024/0377006 A1      Nov. 14, 2024

(30) Foreign Application Priority Data

May 10, 2023    (EP) .................................... 23172631

(51) Int. Cl.
    F16L 23/036          (2006.01)
(52) U.S. Cl.
    CPC .................................. F16L 23/036 (2013.01)
(58) Field of Classification Search
    CPC .................................................... F16L 23/036
    See application file for complete search history.

(56) References Cited

U.S. PATENT DOCUMENTS

2004/0036293 A1* 2/2004 Flindall ................. F16L 23/036
                                                                285/412

2012/0161441 A1*  6/2012  Hall ...................... F16L 23/036
                                                                285/412
2023/0061814 A1     3/2023  Phillips et al.

FOREIGN PATENT DOCUMENTS

| CN | 113503408 A | * | 10/2021 | |
| CN | 114215977 A | * | 3/2022 | ............ F16L 23/036 |
| CN | 114183598 B | | 9/2022 | |
| EP | 0205898 B1 | | 5/1989 | |
| EP | 3406955 A1 | * | 11/2018 | ............ H02G 5/063 |
| FR | 1227402 A | | 8/1960 | |
| GB | 2610216 A | | 3/2023 | |

OTHER PUBLICATIONS

European Search Report for corresponding European Patent Application No. 23172631.6 dated Oct. 6, 2023.

* cited by examiner

*Primary Examiner* — Zachary T Dragicevich
(74) *Attorney, Agent, or Firm* — Greer, Burns & Crain, Ltd.

(57)                ABSTRACT

A flange coupling system for connecting pipes in an aircraft, comprises a first flange element and a second flange element, each flange element comprising a flange ring surrounding an opening for transporting a liquid or gaseous medium. Each flange ring comprises a sealing surface for mutual connection of both flange elements. Each flange element comprises one or more fixation members configured for mutual fixation of both flange elements so that their sealing surfaces are pressed against each other in a sealing plane. The fixation members of both flange elements are arranged in a way that both flange elements are fixed to each other in a fixation plane which is located away from the sealing plane.

20 Claims, 3 Drawing Sheets

1

FLANGE COUPLING SYSTEM FOR CONNECTING PIPES IN AN AIRCRAFT

CROSS-REFERENCES TO RELATED APPLICATIONS

This application claims the benefit of European Patent Application Number 23 172 631.6 filed on May 10, 2023, the entire disclosure of which is incorporated herein by way of reference.

FIELD OF THE INVENTION

The invention relates to a flange coupling system for connecting pipes in an aircraft. Further, the invention relates to an aircraft comprising a flange coupling system.

In particular, the invention supports the installation of hydrogen systems on an aircraft. The invention can be used as well for pipe or line systems transporting other mediums. Moreover, the invention is suitable for venting systems and/or gaseous distribution systems in an aircraft. The invention can be applied particularly for the connection of single pipe segments within a double walled piping system.

BACKGROUND OF THE INVENTION

FIG. 3 shows an example of a flange connection 100 according to the state of the art. It comprises two flanges 101, 102 which are connected to each other by bolts 103. The flanges are pressed against each other in a sealing and clamping plane 104 where a sealing ring 105 is provided between the flanges 101, 102.

Such a conventional flange connection has a relatively large diameter which requires a large installation space. In particular, in a double walled pipe assembly necessary in an aircraft, a huge coupling in terms of diameter for the inner line or pipe leads to a large diameter of the outer line of the double walled pipe assembly.

A large installation space is needed for such conventional couplings. Further, the weight is increased which leads to an increased fuel consumption of the aircraft.

SUMMARY OF THE INVENTION

It is an objective of the invention to provide a flange coupling for connecting pipes in an aircraft, which needs less installation space and which has a reduced weight.

According to a first aspect, the invention provides a flange coupling system for connecting pipes in an aircraft, comprising: a first flange element comprising a first flange ring and a second flange element comprising a second flange ring, each flange ring surrounding an opening for transporting a liquid or gaseous medium, wherein each flange ring comprises a sealing surface for mutual connection of both flange elements, wherein each flange element comprises one or more fixation members configured for mutual fixation of both flange elements so that their sealing surfaces are pressed against each other in a sealing plane, wherein the fixation members of both flange elements are arranged in a way that both flange elements are fixed to each other in a coupling plane which is located away from the sealing plane.

In particular, the flange elements are fixed to each other by fastening elements that are arranged at a radial distance from the center axis of the flange rings which is smaller than the radial extension of the flange rings.

That means in particular, that the fastening elements are arranged within a projection of the flange rings in the direction of their center axis.

Preferably, the fixation members of the first flange element are configured to be fixed to the fixation member of the second flange element within a projection of the flange rings in the direction of their center axis.

That means in particular, that the fixation members of the first flange element are configured to be fixed to the fixation member of the second flange element at a radial distance from the center axis of the flange rings which is smaller than the radial extension of the flange rings.

In particular, the direction of the center axis is also understood as the coupling direction.

Preferably, the fixation members of the first flange element are attached to the first flange element, in particular by attachment means, at positions located within a projection of the first flange ring in the direction of its center axis.

That means in particular, that the attachment means are positioned at a radial distance from the center axis of the first flange ring which is smaller than the radial extension of the flange rings.

Preferably, the fixation members of the first flange element are configured to extend from the side of the first flange ring which is facing away from the sealing plane over both flange rings to reach behind the second flange ring.

Preferably, the fixation members of the first flange element are configured to be fixed behind the second flange ring, that means at the side of the second flange ring which is facing away from the sealing plane, to the fixation member of the second flange element.

Preferably, the fixation members of the first flange element are configured for pulling the fixation member of the second flange element on its side facing the sealing plane, to press the second flange element against the first flange element.

Preferably, the fixation members of the first flange element are pivotable about an axis tangential to its flange ring.

Preferably, the fastening elements are configured to fasten the fixation member of the second flange element to the fixation members of the first flange element in the fixation plane, wherein the fastening elements are positioned behind the second flange ring when looking from the first flange ring in the direction of its center axis, i.e., on the side of the second flange ring facing away from the sealing plane.

Preferably, the fixation member of the second flange element is arranged at a distance from the second flange ring on its side opposite the sealing surface.

Preferably, the fixation member of the second flange element is configured for being fastened to front ends the fixation members of the first flange element when the front ends are positioned between the second flange ring and the tension ring.

Preferably, the fixation members of the first flange element are attached to the first flange element in a way that they are movable in the direction of its center axis.

In this way, the front ends of these fixation members can be to be positioned between the second flange ring and the fixation member of the second flange element when the flange elements are mutually connected.

Preferably, the flange ring of the first flange element comprises a groove formed at the opposite side of its sealing surface to receive protrusions provided by the fixation members of the first flange element for holding them in position when both flange elements are being coupled.

Preferably, the first flange element comprises claw attachment means for attaching the fixation members, wherein the fixation members are configured to transfer loads across at least the flange ring, and the attachment means are preferably configured to hold the fixation members in place without any load transfer.

Preferably, the flange coupling system is configured for connecting pipe segments within a double walled piping system.

According to a second aspect, the invention provides an aircraft comprising a flange coupling system according to the invention.

The invention achieves that the flange coupling is more compact and has a reduced weight. In particular, the diameter of the coupling is drastically reduced due to the more compact design of the flange connection.

This is achieved in particular by the separation of the two functions sealing and coupling from one plane to two separate planes.

In particular, a double walled pipe assembly having an outer line or pipe with a reduced diameter can be provided by coupling its inner line or pipe with the flange coupling system according to the invention.

Since a reduced outer line diameter of a double walled piping system is achieved by the invention, the forces due to pressure acting on the circular contact area of the mutually connected flanges are reduced. This results in weight reduction plus an additional weight reduction due to the smaller geometry of the flange coupling system. Thus, two levers of weight reduction are achieved by the invention.

BRIEF DESCRIPTION OF THE DRAWINGS

A preferred embodiment of the invention is described in more detail with reference to the accompanying drawings, in which.

DETAILED DESCRIPTION OF THE PREFERRED EMBODIMENTS

Figure 1:
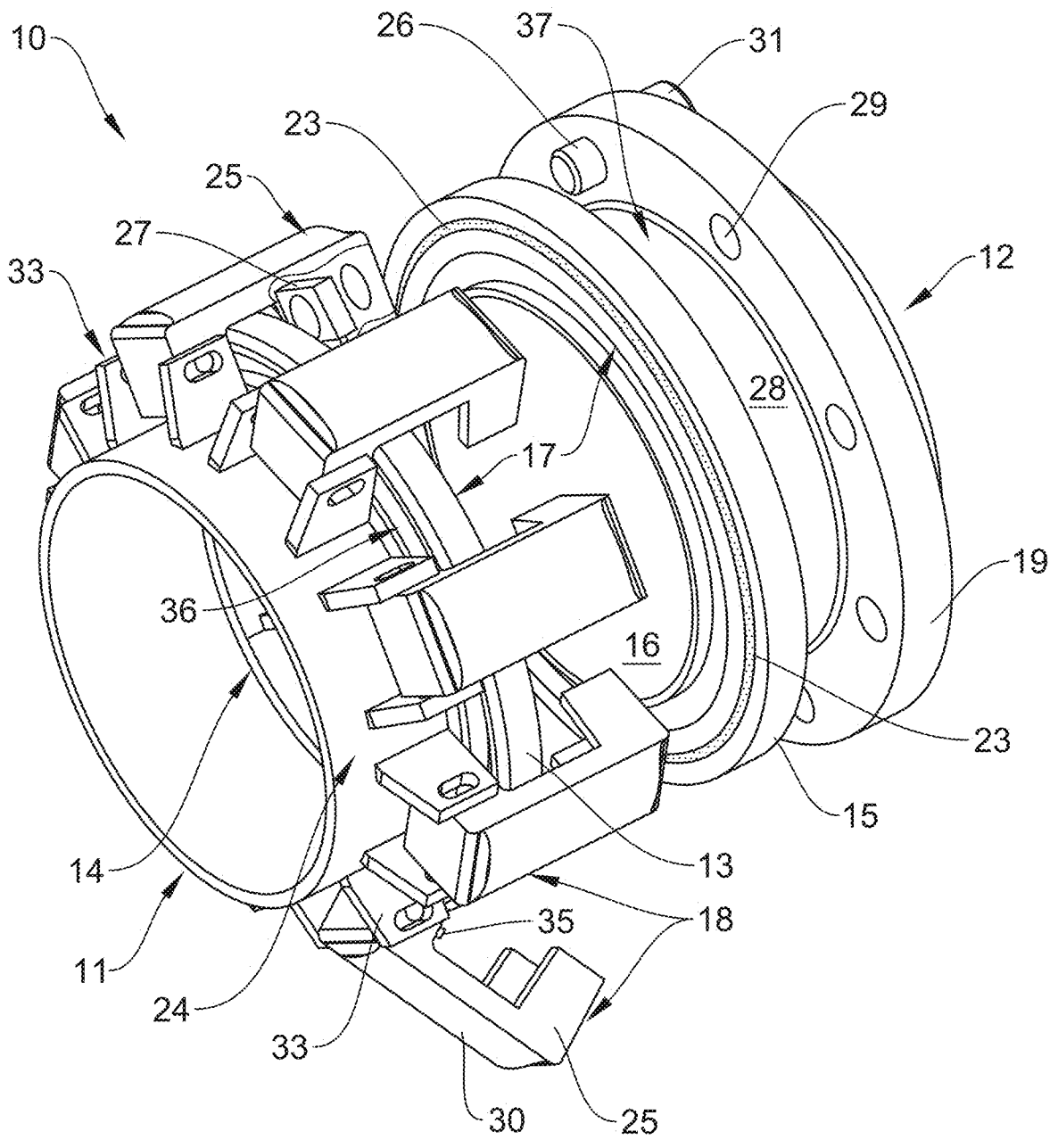
FIG. 1 depicts a perspective view of a flange coupling system according to a preferred embodiment of the invention.
Figure 2:
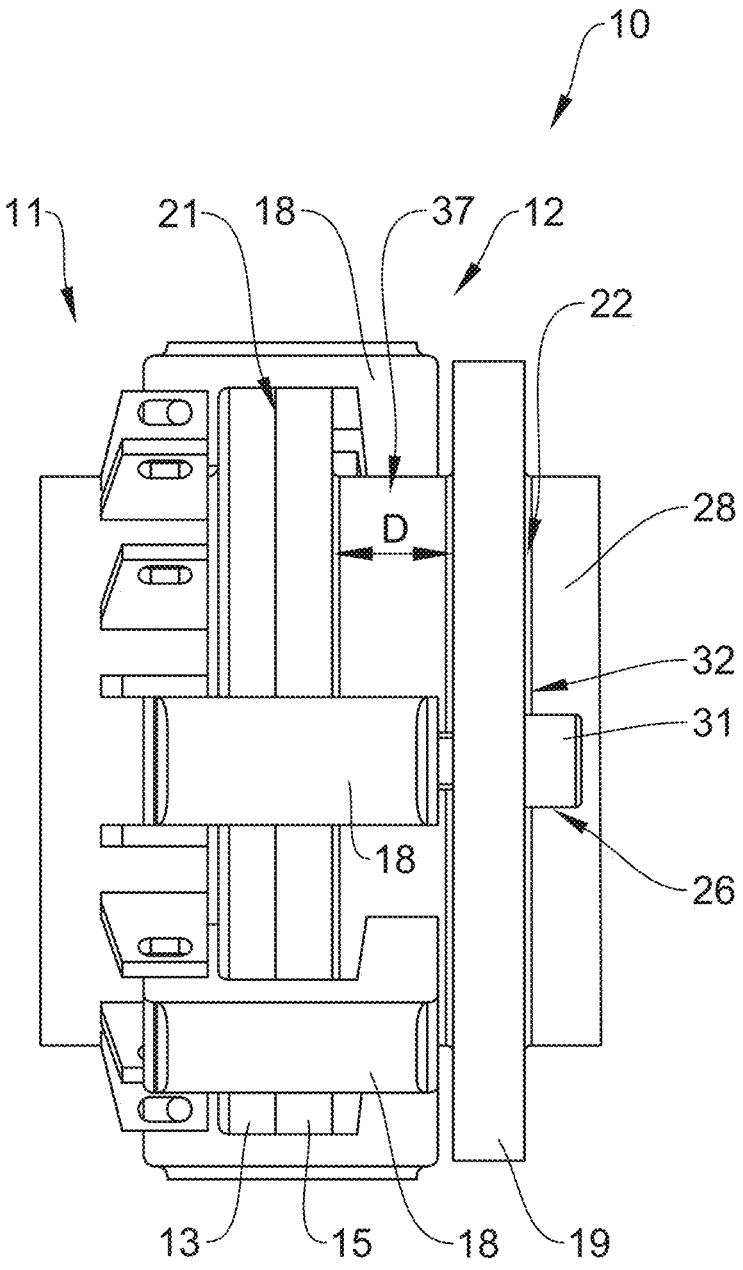
FIG. 2 depicts a side view of the flange coupling system when it's flange elements are connected.
Figure 3:
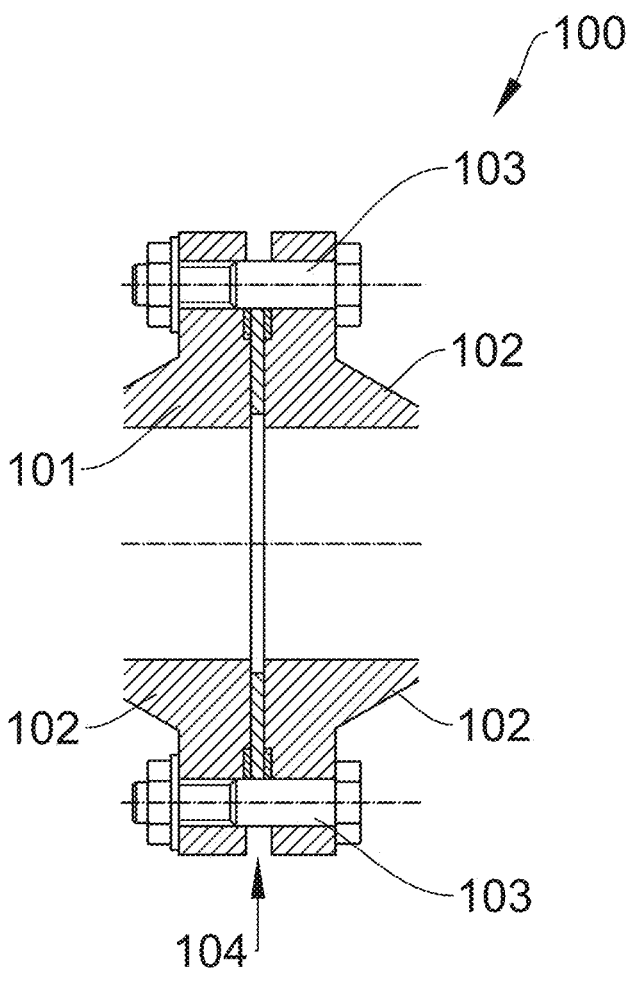
FIG. 3 depicts a schematic sectional view of a conventional flange according to the state of the art.

FIGS. 1 and 2 show a flange coupling system 10 according to a preferred embodiment of the invention. It comprises a first flange element 11 and a second flange element 12 which are configured for being connected to each other. The first flange element 11 comprises a disc-shaped flange ring 13 which surrounds an opening 14 for transporting a liquid or gaseous medium. Similarly, the second flange element 12 comprises a second disc shaped flange ring 15 surrounding an opening 16 for transporting the liquid or gaseous medium. Each flange ring 13, 15 comprises a sealing surface 17 for mutual connection of both flange elements 11, 12.

Each flange element 11, 12 comprises one or more fixation members 18, 19 which are configured for mutual fixation of both flange elements 11, 12 so that their sealing surfaces 17 are pressed against each other in a sealing plane 21 (see FIG. 2). The sealing plane 21 is formed by the mutually connected sealing surfaces 17 of both flange elements 11, 12.

The fixation members 18, 19 of both flange elements 11, 12 are arranged in a way that both flange elements 11, 12 are fixed to each other by fastening elements 26 formed as bolts in a coupling or fixation plane 22 which is located away from the sealing plane 21 (see FIG. 2).

As depicted in FIG. 1, a sealing formed as a sealing ring 23 is provided in the sealing surface 17 of the second flange element 12. It may also be provided in the sealing surface 17 of the first flange element 11 or in the sealing surface 17 of both flange elements 11, 12. In this embodiment, the sealing ring 23 or gasket has an O-shaped cross section. But it may also have another cross section, like e.g. a C-shaped cross section. In particular, the sealing ring 23 is positioned in a ring-shaped groove formed in the sealing surface 17 of the respective flange element 11 and/or 12.

Both sealing surfaces 17 form a circular area which provides the sealing plane 21 when both flange elements 11, 12 are interconnected with their sealing surfaces 17.

The fixation members 18 of the first flange element 11 are designed as or comprise a number of claws 18 which are distributed around the sealing surface 17 and extending from the first flange element 11 over its flange ring 13 and over the flange ring 15 of the second flange element 12 when both flange elements 11, 12 are mutually connected.

More precisely, as shown in detail in FIG. 1, the claws 18 extend from the backside of first flange ring 13, which side is facing away from the sealing plane 21, across both flange rings 13, 15 behind second flange ring 15, i.e., to the backside side of second flange ring 15 which is facing away from the sealing plane at its opposite side, when both flange elements 11, 12 are mutually connected.

The claws 18 are arranged circumferentially on the outer side 24 of first flange element 11. Advantageously, they are arranged at equal distances to provide an equal distribution of forces for pressing the sealing surfaces 17 of both flange elements 11, 12 against each other.

Each claw 18 comprises a front end 25 which is configured as a fastener for fastening bolt 26, which is provided for fixing the fixation member 19 of the second flange element 12 to the front end 25 of the respective claw 18 of the first flange element 11 in the fixation plane 22.

For this purpose, a square nut 27 is arranged in the front end 25 of each claw 18 for receiving a threaded front portion of fastening element or bolt 26. However, it is also possible to provide a screw thread or another type of fastening element within the front ends 25.

The fixation member 19 of second flange element 12 is formed as a tension ring which is arranged on the outer side 28 of second flange element 12, or more specifically of a pipe section 37 of flange element 12.

The fixation member or tension ring 19 surrounds second flange element 12, being at a distance D from the flange ring 15 of second element flange 12 which provides at its front side the sealing surface 17.

That means that the tension ring 19 is spaced away from flange ring 15 which provides at its sealing surface 17 the sealing plane 21.

The tension ring 19 is configured for being fastened to the claws 18 of first flange element 11. For this purpose, a number of through holes 29 are provided in tension ring 19 for holding the fastening elements or bolts 26 when they are screwed into the nuts 27 or screw threads provided in the front end 25 of claws 18, so that the claws 18 are pulled to tension ring 19 when both flange elements 11, 12 are being coupled to each other by tightening the bolts 26.

The claws 18 are formed to reach behind flange ring 15 of second flange element 12 and to be pulled towards the tension ring 19 when both flange elements 11, 12 are being coupled to each other.

Advantageously, the claws 18 are comprising or are formed as straight arms 30 which extend flat across the flange rings 13, 15 which provide the contact surfaces 17 for mutual connection of both flange elements 11, 12.

Each arm 30 comprises an angled end portion which forms front end 25, so that each claw 18 reaches with its front end 25 behind the flange ring 15 of second flange element 12.

In this way, the angled front ends 25 of claws 18 are positioned between flange ring 15 of the first flange element 11 and tension ring 19 of the second flange element 12, i.e., behind second flange ring 15 in the axial direction of the connected flange rings 13, 15, when both flange elements 11, 12 are coupled. Then, both flange elements 11, 12 are fixed to each other by screwing the bolts 26 into nuts 27.

When the bolts or screws 26 are tightened, the claws 18 are pulled towards tension ring 19 while the bolt heads 31 of bolts 26 are pressed against backside 32 of tension ring 19, which forms in this way the clamping or coupling plane 22 when both flanges 11, 12 are coupled.

As shown in detail in FIGS. 1 and 2, the bolts 26 extend through tension ring 19 into or through the front ends 25 of claws 18 when the front ends 25 of the claws 18 are positioned between flange ring 15 and tension ring 19 (see FIG. 1), which are spaced apart by distance D (see FIG. 2).

In this way, the fastening elements or bolts 26 fasten the tension ring 19 of the second flange element 12 to the claws 18 of the first flange element 11 when the flange rings 13, 15 are connected to each other at sealing surface 17, The bolts are positioned behind the mutually connected flange rings 13, 15 when viewing from the first flange ring 13 in the direction of its center axis to the second flange ring 15, i.e. in the coupling direction. That means that the bolts 26 are positioned within a projection of the flange rings 13, 15, i.e., within the radius of the flange rings 13, 15.

In other words, the fastening elements or bolts 26 are arranged at a radial distance from the center axis of the flange rings 13, 15 which is smaller than the radial extension of the flange rings 13, 15.

In this way, the radial extension of flange coupling system 10 is drastically reduced.

When both flange elements 11, 12 are fastened to each other by tightening the bolts 26, the front ends 25 of claws 18, which are positioned behind the second flange element 12, i.e., between that flange element 12 and tension ring 19, are pulled towards the tension ring 19. This presses both flange elements 11, 12 against each other in the sealing plane 21.

Each claw 18 is movable mounted in attachment means 33 which are circumferentially provided on the outer side 24 of first flange element 11. More specifically, the attachment means 33 are circumferentially provided on the outer side 24 of a pipe section 34 of first flange element 11.

The claws 18 are pivotable mounted in attachment means 33 so that they can be opened for attaching the second flange element 12 to the first flange element 11 at the contact or sealing surfaces 17, and can be closed for fixing the front ends 25 to bolts 26 which are held in tension ring 19.

As visible from FIGS. 1 and 2, each claw 18 comprises at its rear end protrusions formed as a couple of pins on both opposite sides of the claw 18. By the protrusions, each claw 18 is pivotably suspended in openings facing each other which are formed in side walls of the attachment means 33.

In this way, fixation members or claws 18 of the first flange element 11 are pivotably attached to the first flange element 11 by the attachment means 33.

Thus, the arrangement of claws 18 can be opened, i.e. the claws 18 can be pivoted radially outwards to an open position in which the flange rings 13, 15 can be brought in mutual contact. The claws 18 can also be closed, i.e., they can be pivoted radially inwards to a closed position in which the flange rings 13, 15 can be separated.

This allows the front ends 25 of claws 18, which are attached to first flange element 11 by the claw attachment means 33, to be positioned between the fixation member or tension ring 19 of the second flange element 12 when both flange elements 11, 12 are coupled to each other.

The attachment means 33 in which the claws are suspended, are configured to allow each fixation member or claw 18 to pivot about an axis that extends in a tangential direction of the first flange ring 13, and thus to pivot the respective claw 18 radially outwards and radially inwards about its pivot axis.

The two opposing openings in the side walls of the attachment means 33, which are configured for holding the pins arranged on both sides in the rear end of the respective claw 18, define the pivot axis of that claw 18 (see FIG. 1).

The flange ring 13 can be geometrically described as a cylinder. Tangential direction means the direction of a tangent line of flange ring 13. Thus, the fixation members 18 of the first flange element 11 are attached to the first flange element 11 in a way that the fixation members 18 are allowed to pivot about an axis that extends parallel to a tangent line of the first flange ring.

The opposite openings or suspension holes in the side walls of the attachment means 33, which define the pivot axis of the claw 18 suspended therein, are positioned at the backside of first flange ring 13, i.e., at a radial distance from the center axis of the flange ring 13 which is smaller than the radial extension of the flange ring 13 (see FIG. 1).

Therefore, the pivot axis of each claw 18 is located at a position at the backside of the first flange ring 13 facing away from the sealing surface 21, at a radial distance from the center axis of the flange ring 13 which is smaller than the radial extension of the flange ring 13 (see FIG. 1).

In addition, since the flange ring 13 has a cylindrical geometry, the pivot or rotation axis is also perpendicular to the center axis or longitudinal axis of flange ring 13.

The side walls of each attachment means 33 in which the claws 18 are suspended are facing each other. They are mounted on the outer side 24 of flange element 11 which is formed as a pipe in the section where the claws 18 are attached, and they extend radially outwards from the outer side 24 of that section which forms a claw attachment section.

The outer side 24 of flange element 11 in the section where the claws 18 are attached has a smaller diameter than the flange ring 13 at the front end of flange element 11. Further, the radial extension of the claw attachment means 33 mounted on the outer side 24 is smaller than the radius of flange ring 13. Thus, the claw attachment means 33 are completely behind first flange element 11 in the coupling direction, i.e., they do not extend beyond the flange ring 13 in the radial direction, so that the diameter of flange element 11 is drastically reduced.

In addition, only a flat central portion of the arm 30 of each claw 18, which is located between its front end 25 and its rear end, protrudes a little bit and only by its thickness beyond the flange ring 13 in its radial direction, to extend over both flange rings 13, 15 when the flange elements 11, 12 are connected to each other.

This leads to a further reduction of the diameter of flange element 11 and of the whole flange coupling system 10. The thickness of the central portion the arm 30 can be kept relatively small. The angled front end 25 and the rear end can be relatively thick because they are behind the sealing plane 21 on both sides of it.

Thus, the radius of coupling system 10 is limited by the radius of the coupled flange rings 13, 15 plus the thickness of the arms 30 of claws 18 extending over both flange rings 13, 15.

In addition, the attachment means 33 are configured to allow a movement of the respective claw 18 towards flange ring 13. By this movement, a protrusion 35 of claw 18 is engaged with a groove 36 provided on the backside of flange ring 13. This has the function to hold the claws 18 in position.

Thus, the fixation members or claws 18 of the first flange element 11 are not only pivotable suspended, but also movable towards the sealing surface 17, i.e., in the axial direction of flange ring 13 or in the direction of its center axis.

Due to this movement, the mutually connected flange elements 11, 12 can be pulled against each other by mutually fastening their fixation members 18, 19.

The axial movement of the claws 18 relative to the flange element 11 is due to the fact that the openings in the side walls of the attachment means 33, in which the claws 18 are suspended, are formed as long holes which extend in the axial direction, i.e., in the direction of the center axis of first flange element 11.

As described above, the clamping force will not be applied directly on the sealing plane 21. Instead, it is applied on the tension ring 19 which is located away from the sealing plane 21. When the fastening elements or bolts 26 are tightened, the load is transferred from the backside 32 of tension ring 19 via the bolts 26 and the claws 18 to flange 11 which comprises the claw attachment means 33.

The claws 18 transfer the loads from their front ends 25 across both flange rings 15, 13 behind flange ring 13 by using a tongue and groove principle realized by protrusion 35 of claw 18 and groove 36 of flange ring 13. The attachment means 33 have no primary load transfer purpose. Rather, their function is to hold the claws 18 in place and enable an easier assembling.

In particular, the flange coupling system 10 is configured for connecting pipe segments within a double walled piping system. Advantageously, inner pipe segments within a double walled piping system are connected by the flange coupling system 10.

The flange coupling system 10 is in particular used in an aircraft, preferably in a hydrogen system of the aircraft.

Further Examples

The preferred embodiment described above and further examples of the flange coupling system according to the invention preferably show one or more of the following features:

The fixation members of the first flange element may comprise claws distributed around the sealing surface and extending from the first flange element over the flange ring (13) of the first flange element (11) and over the flange ring (15) of the second flange element (12) when both flange elements (11, 12) are mutually connected.

Each fixation member (18) of the first flange element (11) may comprise a front end (25) which is configured as a fastener for a bolt (26) provided for fixing the fixation member (19) of the second flange element (12) to the fixation member (18) of the first flange element (11) in the fixation plane (22).

The fixation member (19) of the second flange element (12) may comprise or can be formed as a tension ring spaced away from its flange ring (15) which provides the sealing plane (21), wherein the tension ring is configured for being fastened to the fixation members (18) of the first flange element (11).

The fixation members (18) of the first flange element (11) may be formed to reach behind the flange ring (15) of the second flange element (12) and to be pulled towards the tension ring (19) when both flange elements (11, 12) are being coupled to each other.

The fixation member (19) of the second flange element (12) may comprise a number of through holes (29) for holding the bolts (26) when they are fixed to the ends (25) of the fixation members (18) of the first flange element (11).

The fixation members (18) of the first flange element (11) may comprise nuts (27) for fastening the bolts (26).

The fixation members (18) of the first flange element (11) may be pivotable about an axis tangential to its flange ring (13), and/or movable towards its sealing surface (17).

The flange ring (13) of the first flange element (11) may comprise a ring groove (36) formed at the opposite side of its sealing surface (17) to receive protrusions (35) provided by the fixation members (18) of the first flange element (11) for holding them in position when both flange elements (11, 12) are being coupled.

The first flange element (11) may comprise claw attachment means (33) for the fixation members (18), wherein the fixation members (18) are configured to transfer loads across at least the flange ring (13), and the attachment means (33) are configured to hold the fixation members (18) in place without any load transfer.

The flange coupling system may be configured for connecting pipe segments within a double walled piping system.

An aircraft may comprise a hydrogen system equipped with a flange coupling system comprising the features above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 coupling system
11 first flange element
12 second flange element
13 flange ring of first flange element
14 opening
15 flange ring 15 of second flange element
16 opening
17 sealing surfaces 18 fixation members of first flange element/claws
19 fixation member of second flange element/tension ring
21 sealing plane
22 coupling plane
23 sealing ring
24 outer side of first flange element
25 front end of claw
26 bolt/fastening element
27 nuts
28 outer side of second flange element
29 through holes
30 arms of claws
31 bolt heads
32 backside of tension ring
33 attachment means
34 pipe section of first flange element
35 protrusion of claw
36 groove
37 pipe section of second flange element
D Distance

The invention claimed is:

1. A flange coupling system for connecting pipes in an aircraft, comprising:
a first flange element comprising a first flange ring and a second flange element comprising a second flange ring,
each flange ring surrounding an opening for transporting a liquid or gaseous medium,
wherein each flange ring comprises a sealing surface for mutual connection of both flange elements,
wherein each flange element comprises one or more fixation members configured for mutual fixation of both flange elements so that the sealing surfaces are pressed against each other in a sealing plane,
wherein the one or more fixation members of both flange elements are configured such that the first and second flange elements are fixed to each other in a fixation plane which is located away from the sealing plane, and
wherein the first and second flange elements are fixed to each other by fasteners which have axes that are arranged parallel to, and arranged at a radial distance from, a center axis of the first and second flange rings, such that the radial distance is smaller than a radial extension of the first and second flange rings.

2. The flange coupling system according to claim 1, wherein the one or more fixation members of the first flange element are configured to be fixed to a fixation member of the second flange element within a projection of the first and second flange rings in a direction of the center axes of the first and second flange rings.

3. The flange coupling system according to claim 1, wherein the one or more fixation members of the first flange element are attached to the first flange element at positions located within a projection of the first flange ring in a direction of the center axis of the first flange ring.

4. The flange coupling system according to claim 1, wherein the one or more fixation members of the first flange element are configured to extend from a side of the first flange ring which is facing away from the sealing plane over both flange rings to reach behind the second flange ring, and to be fixed at a side of the second flange ring which is facing away from the sealing plane to a fixation member of the second flange element.

5. The flange coupling system according to claim 1, wherein the one or more fixation members of the first flange element are pivotable about an axis tangential to the first flange ring.

6. The flange coupling system according to claim 1, wherein one or more fastening elements are configured to fasten the fixation member of the second flange element to the fixation members of the first flange element in the fixation plane, and
wherein the one or more fastening elements are positioned behind the second flange ring when looking from the first flange ring in a direction of the center axis of the first flange ring.

7. The flange coupling system according to claim 1, the one or more fixation member of the second flange element are arranged at a distance from the second flange ring on a side opposite the sealing plane, and are configured for being fastened to front ends of fixation members of the first flange element when the front ends are positioned between the second flange ring and the fixation member.

8. The flange coupling system according to claim 1, wherein the one or more fixation members of the first flange element are attached to the first flange element and configured to move in a direction of the center axis of the first flange element.

9. The flange coupling system according to claim 1, wherein the flange ring of the first flange element comprises a groove formed at a side opposite the sealing surface to receive protrusions provided by the one or more fixation members of the first flange element for holding the one or more fixation members in position when both flange elements are being coupled.

10. The flange coupling system according to claim 1, wherein the first flange element comprises claw attachment means for attaching the one or more fixation members,
wherein the one or more fixation members are configured to transfer loads across at least the flange ring, and
wherein the attachment means are configured to hold the one or more fixation members in place without any load transfer.

11. The flange coupling system according to claim 1, wherein the flange coupling system is configured for connecting pipe segments within a double walled piping system.

12. An aircraft comprising:
a hydrogen system equipped with the flange coupling system according to claim 1.

13. A flange coupling system for connecting pipes in an aircraft, comprising:
a first flange element comprising a first flange ring and a second flange element comprising a second flange ring,
each flange ring surrounding an opening for transporting a liquid or gaseous medium,
wherein each flange ring comprises a sealing surface for mutual connection of both flange elements,
wherein each flange element comprises one or more fixation members configured for mutual fixation of both flange elements so that the sealing surfaces are pressed against each other in a sealing plane,
wherein the one or more fixation members of both flange elements are configured such that the first and second flange elements are fixed to each other in a fixation plane which is located away from the sealing plane, and
wherein the one or more fixation members of the first flange element are pivotable about an axis tangential to the first flange ring,
wherein the first and second flange elements are fixed to each other by fasteners and the one or more fixation members of the second flange element are formed as a tension ring which is arranged on an outer side of the second flange element, such that the tension ring includes through holes which receive the fasteners.

14. The flange coupling system according to claim 1, wherein a sealing ring is provided in a groove in the sealing surface of the second flange element.

15. The flange coupling system according to claim 13, wherein a sealing ring is provided in a groove in the sealing surface of the second flange element.

16. The flange coupling system according to claim 13, wherein the fasteners are parallel to, and arranged at a radial distance from, a center axis of the first and second flange rings, such that the radial distance is smaller than a radial extension of the first and second flange rings.

17. The flange coupling system according to claim 13, wherein a head of the fasteners engages the tension ring, and threading of the fasteners thread with the one or more fixation members of the first flange element.

18. The flange coupling system according to claim 1, wherein the one or more fixation members of the second flange element are formed as a tension ring which is arranged on an outer side of the second flange element, such that the tension ring includes through holes which receive the fasteners.

19. The flange coupling system according to claim 18, wherein a head of the fasteners engages the tension ring, and threading of the fasteners thread with the one or more fixation members of the first flange element.

20. A flange coupling system for connecting pipes in an aircraft, comprising:

a first flange element comprising a first flange ring and a second flange element comprising a second flange ring, each flange ring surrounding an opening for transporting a liquid or gaseous medium, wherein each flange ring comprises a sealing surface for mutual connection of both flange elements, wherein each flange element comprises one or more fixation members configured for mutual fixation of both flange elements so that the sealing surfaces are pressed against each other in a sealing plane, wherein the one or more fixation members of both flange elements are configured such that the first and second flange elements are fixed to each other in a fixation plane which is located away from the sealing plane, wherein the first and second flange elements are fixed to each other by fasteners which have axes that are arranged parallel to, and arranged at a radial distance from, a center axis of the first and second flange rings, such that the radial distance is smaller than a radial extension of the first and second flange rings, and wherein the one or more fixation members of the second flange element are formed as a tension ring which is arranged on an outer side of the second flange element, such that the tension ring includes through holes which receive the fasteners.

* * * * *